United States Patent [19]

Smith et al.

[11] 3,995,489
[45] Dec. 7, 1976

[54] MALONIC ACID DERIVATIVE COMPOSITION FOR FORMING THERMOPARTICULATING COATING

[75] Inventors: James D. B. Smith, Turtle Creek; David C. Phillips, Pittsburgh, both of Pa.

[73] Assignee: Westinghouse Electric Corporation, Pittsburgh, Pa.

[22] Filed: Apr. 15, 1975

[21] Appl. No.: 568,219

[52] U.S. Cl. .......................... 73/339 R; 73/432 R; 252/408; 260/33.6 EP
[51] Int. Cl.² .................................. G01K 13/02
[58] Field of Search ............ 73/339 R, 349, 432 R; 310/52, 55, 56; 252/408; 260/33.6 EP

[56] References Cited

UNITED STATES PATENTS

| | | | |
|---|---|---|---|
| 3,427,880 | 2/1969 | Grobel et al. | 73/339 |
| 3,807,218 | 4/1974 | Carson et al. | 73/28 |

OTHER PUBLICATIONS

Chemistry of Carbon Compounds, Edited by E. H. Rodd, vol. 1B, 1952 edition, pp. 961, 962.

*Primary Examiner*—Richard C. Queisser
*Assistant Examiner*—John S. Appleman
*Attorney, Agent, or Firm*—R. D. Fuerle

[57] ABSTRACT

A composition is disclosed of a malonic acid derivative, a resinous carrier, and a solvent. The composition is applied to a portion of an electrical apparatus which is exposed to a gas stream. The solvent in the composition is evaporated to produce a thermoparticulating coating. When the electrical apparatus overheats the malonic acid derivative in the coating forms particles in the gas stream which are detected by a monitor.

18 Claims, No Drawings

MALONIC ACID DERIVATIVE COMPOSITION FOR FORMING THERMOPARTICULATING COATING

REFERENCES TO RELATED APPLICATIONS

This application is related to application Ser. No. 390,284 filed Aug. 21, 1973 by J. D. B. Smith and D. C. Phillips titled "Malonic Acid Composition For Thermoparticulating Coating".

This application is related to application Ser. No. 426,391 filed Dec. 19, 1973 by Emil M. Fort, Thomas D. Kaczmarek, and David Colin Phillips titled "Sampling System for Power Generators."

This application is also related to application Ser. No. 568,222, filed of even date by J. D. B. Smith, J. F. Meier, and D. C. Phillips titled "Blocked Isocyanate Composition for Forming Thermoparticulating Coating."

This application is related to application Ser. No. 568,221, filed of even date by J. D. B. Smith and D. C. Phillips titled "Metal Acetyl Acetonate Composition for Forming Thermoparticulating Coating."

This application is related to application Ser. No. 568,224, filed of even date by J. D. B. Smith and D. C. Phillips titled "Diazonium salt Composition for Forming Thermoparticulating Coating."

This application is related to application Ser. No. 568,223 filed of even date by J. D. B. Smith and D. C. Phillips and K. W. Grosset titled "Grease Theremoparticulating Coating."

This application is related to application Ser. No. 568,218 filed of even date by D. C. Phillips, W. M. Hickam, and J. D. B. Smith titled "Multiple Signal Thermoparticulating Coating."

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

Descriptions of such monitors and how they function may be found in U.S. Pat. No. 3,427,880 titled "Overheating Detector for Gas Cooled Electrical Machine" and in U.S. Pat. No. 3,573,460 titled "Ion Chamber for Submicron Particles." Another monitor, "The Condensation Nuclei Detector," is described by F. W. Van-Luik, Jr. and R. E. Rippere, in an article titled "Condensation Nuclei, A New Technique for Gas Analysis," in Analytical Chemistry 34, 1617 (1962) and by G. F. Skala, in an article titled "A New Instrument for the Continuous Detection of Condensation Nuclei," in Analytical Chemistry 35, 702 (1963).

As U.S. Pat. Nos. 3,427,880 and 3,807,218 suggest, special coatings may be applied to the apparatus which decompose and form detectable particles at a lower temperature than the usual organic compounds found in the apparatus. For example, those patents mention polyalphamethylstyrene, polystyrene, polymethyl methacrylate, and cellulose propoinate which decompose to form particles at 230° to 340° C. Unfortunately, since these machines normally operate at about 50° to 100° C, they may be severely damaged by the time the temperature reaches 230° to 340° C.

Efforts to identify materials which will decompose to form detectable particles (i.e., thermoparticulate) at temperatures closer to the operating temperature of the machine have met with several difficulties. Many compounds, such as succinic acid, maleic acid, fumaric acid, and polyacrylic acid, do not decompose below 190° C. Others, such as acetic acid, are liquids which boil and therefore are unsuitable. Some compounds, such as oxalic acid, decompose at a low temperature but the decomposition products do not include detectable particles. Compounds such as 1,2-diformylhydrazine have some of the desirable properties but cannot withstand several years operation at 80 to 100° C. A few compounds contain toxic or corrosive substances in their decomposition products which may render them unsuitable.

State of the Prior Art

A book titled "Chemistry of Carbon Compound," Vol. l·B, page 962 and 968 by E. H. Rodd gives the decomposition temperature of malonic acid and many of its derivatives.

SUMMARY OF THE INVENTION

We have found that malonic acid derivatives can be used in a composition to form a thermoparticulating coating which produces detectable particles at about 180° C or less. The coating can be made compatible with the other organic compounds in the apparatus. The coating is very stable and can withstand several years operation at 60 to 100° C without decomposing, yet still produce detectable particles when the temperature reaches about 119° to 180° C (depending on the particular derivative used).

We have also found that when the coating is heated to about the thermoparticulating temperature of the coating it blisters and becomes a very dark brown color which is a considerable aid in locating the malfunction.

In addition, we have found that the combination of a coating of the derivative on an insulator is significantly more stable than the combination of a coating of the derivative on a conductor.

Finally, all of the malonic acid derivatives thermoparticulate to give products which are more readily distinguishable from the background particles in the generator than the thermoparticulation products produced by malonic acid itself. They also produce a more visible charring after thermoparticulating which makes them easier to locate and, with the exception of diethyl malonic acid which is about the same as malonic acid, they all produce stronger signals.

DESCRIPTION OF THE INVENTION

The thermoparticulating compounds of this invention are compounds having the general formula

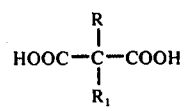

where R is alkyl to $C_{10}$ (straight-chain, branched, or unsaturated), aryl, alkyl aryl to $C_{10}$, cycloaliphatic, or heterocyclic, and $R_1$ is R or hydrogen. These compounds must decompose between about 60 and about 200° C and produce particles larger than about 25A in order for the particles to be detected with presently-existing monitors. Suitable examples include monomethylmalonic acid, dimethylmalonic acid, monethylmalonic acid, diethyl malonic acid, and din-propylmalonic acid. Mixtures of two or more thermoparticulating compounds are also contemplated. Preferably the derivatives contain at least five carbon atoms, as these compounds display overall superior properties.

monoethylmalonic acid is very useful as it particulates at a lower temperature (119° to 127° C) than the other compounds listed. Dimethylmalonic acid is useful where higher temperatures are encountered as it is stable for long periods at 80° C. Also, both the dimethyl malonic acid and the ethyl-malonic acid give a very strong signal which increases the sensitivity of the coating to overheating. For these reasons monoethyl malonic acid and dimethyl malonic acid are preferred.

A composition is prepared of a malonic acid derivative in a solution of a resinous carrier. The malonic acid derivative may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed malonic acid derivative of about 25 to about 1,000 microns is suitable.

A suitable composition is a resinous carrier, about 20 to about 250 phr (parts by weight per hundred parts of resinous carrier) of a malonic acid derivative, and about 25 to about 75% (by weight based on the resinous carrier) of a solvent for the resinous carrier. If the amount of malonic acid derivataive is less than about 20 phr, the quantity of particles given off during decomposition may be too low to be detected by presently-existing detectors. However, the construction of more sensitive detectors would permit a lower amount of malonic acid derivative. If the amount of malonic acid derivative exceeds about 250 phr the composition is thick, difficult to apply, and does not bond well. The preferred amount of malonic acid derivative, which generally gives the best results, is about 40 to about 60 phr. If the amount of solvent is less than about 25% the composition is generally too viscous to apply easily and if the amount of solvent is greater than about 75% the composition is unnecessarily dilute and the coating may be too thin to produce an adequate number of particles during decomposition, at least while the malfunction is highly localized. Best results are usually obtained with about 45 to about 55% solvent.

The resinous carrier performs the function of bonding the malonic acid derivative to the apparatus since a coating of malonic derivative by itself does not adhere well. The resinous carrier should be compatible with the other resins used in the apparatus and therefore it is usually advantageous to use the same resin used elsewhere. The resinous carrier is curable below 60° C and is preferably air-dryable since it cannot be easily cured in place with heat. Also, it should be stable when cured for several years at 60° C. The resin must be unreactive with the malonic acid derivative for otherwise suitable thermoparticulation will not occur. The malonic acid derivative and the resin from a mixture and the malonic acid derivative does not catalyze the cure of the resin.

Epoxy resins are preferred as they are usually used elsewhere in the apparatus, but polyesters, silicone rubber, styrene, etc., could also be used.

The solvent for the resinous carrier depends on the particular resinous carrier used. Toluene, xylene, benzene, methyl ketone, ethyl alcohol, diethyl ether, acetone, cellosolve, etc., are common solvents that may be used. Toluene is preferred as it is inexpensive and dissolves most resins.

The composition also preferably contains about 0.1 to about 3 phr of a drier when the resinous carrier is an epoxy resin or similar resin, to promote its room temperature cure. Lead naphthenate or cobalt naphthenate is preferred although stannous octoate, zinc stearate, etc., could also be used. Resins such as polyesters may also require the presence of an organic peroxide as is known in the art. Mixtures of various resins, solvents, or driers are also contemplated.

The composition may be prepared by simply mixing the ingredients, but it is preferable to mix the drier, resinous carrier, and solvent first and then add the malonic acid derivative and thereby obtain a more homogeneous dispersion of the malonic acid derivative. The composition is applied to portions of the electrical apparatus which are exposed to the gas stream. The coating formed does not function as insulation and is usually applied on top of insulation, but it can also be applied to conductors. The application is preferably made on an insulator instead of on a conductor, because it has been found that the coating is stable at elevated temperatures for a much longer period of time when it is on an insulator. The application may be made by painting, spraying, dipping, grease gun, or other techniques. A suitable coating thickness (after drying) is about one-sixteenth to about one-half inch. The dispersed particles of malonic acid derivative should not be covered with excessive resinous carrier as that may prevent the decomposition particles from escaping into the gas stream. After evaporation of the solvent and room temperature cure of the resinous carrier, if necessary, the apparatus is ready to be operated. When thermoparticulation and the resulting alarm occur, a sample of the gas stream can be collected and analyzed. Since different thermoparticulating compounds can be used in different areas of the apparatus and their thermoparticulating products are different, analysis of the sample can pinpoint the location of the overheating.

The following example further illustrates this invention:

EXAMPLE

The following composition was prepared:

|  | Parts by Weight |
|---|---|
| Malonic acid derivative | 20 |
| Epoxy resin (50% solids in toluene) made from 200 pbw (parts by weight) linseed fatty acids, 200 pbw styrene, and 300 pbw diglycidyl ether of Bisphenol A, sold by Westinghouse Electric Corporation as "B-276" Varnish (See Example 1 of U.S. Patent 2,909,497 for detailed description) | 100 |
| 6% solution in low boiling hydrocarbons of cobalt naphthenate | 1.0 |
| 24% solution in low boiling hydrocarbons of lead naphthenate | 0.25 |

The cobalt and lead naphthenate solutions were added to the epoxy resin prior to the addition of the malonic acid derivative.

Samples were prepared by brushing the above composition onto ¼ by ½ inch aluminum and copper sheets one-sixteenth to one-fourth inch thick. Also, a sample of polyethylene terephthalate (Dacron) felt (which does not thermoparticulate) was immersed into a 20% methanol solution of malonic acid derivative. The samples were dried to form coatings one-fourth inch thick, then placed in an oven at 60° or 80° C for various periods to determine if they were stable and would function after aging.

The samples were placed one at a time on aluminum straps within a 1 inch stainless steel tube. Hydrogen was passed over the sample at flow rate of 7 l/min. A phase-controlled temperature regulator and programmer controlled the temperature in the boat and the temperature in the boat was measured by mounting a hot junction chromel-alumel thermocouple within a small hole in the boat. The output of the thermocouple and the detector were monitored on a two pen potentiostatic recorder. A 5° C/min. heating rate was maintained in each experiment after the insertion of the malonic acid derivative sample in the boat. The threshold temperature at which considerable particulation occurred was taken from the chart produced by the recorder. The occurrence of particulation was detected using a Generator Condition Monitor or a Condensation Nuclei Monitor. Both instruments are sold by Environment One Corporation.

The following table gives the results:

| Compound | Chemical Formula | Aging Condition | Thermoparticulating Temperature Range (° C) |
| --- | --- | --- | --- |
| Methylmalonic Acid | $CH_3CH(COOH)_2$ | 140 days at 60° C | 132–138 |
| Dimethylmalonic Acid | $(CH_3)_2C(COOH)_2$ | 180 days at 80° C | 152–158 |
| Ethylmalonic Acid | $C_2H_5CH(COOH)_2$ | 140 days at 60° C | 119–127 |
| Diethylmalonic Acid | $(C_2H_5)_2C(COOH)_2$ | 3 days at 80° C | 168–180 |
| Di-n-propylmalonic Acid | $(C_3H_7)_2C(COOH)_2$ | 120 days at 80° C | 155–160 |
| Benzylmalonic Acid | $C_6H_5CH_2CH(COOH)_2$ | 50 days at 60° C | 143–151 |
| Phenylmalonic Acid | $C_6H_5CH(COOH)_2$ | 1 day at 60° C | 150–157 |

Other tests showed that methylmalonic acid and ethylmalonic acid should not be subjected to continuous temperatures in excess of about 60° C or they will lose their ability to thermoparticulate. The other malonic acid derivatives can withstand somewhat higher temperatures. In addition to the temperature, the length of time that a malonic acid derivative can be aged and still thermoparticulate depends upon the amount of oxygen in the gas circulating about it, the type of resin used to form the coating, and the type of material the coating is on.

The temperature at which the thermoparticulation occurs depends somewhat on the aging temperature. The thermoparticulation temperature of ethylmalonic acid decreases slightly after aging while the thermoparticulation temperature of the other malonic acid derivatives tested increased slightly after aging.

Dimethylmalonic acidd and ethylmalonic acid have been successfully tested for thermoparticulation inside turbine generators.

What is claimed is:

1. A method of protecting electrical apparatus from damage due to overheating and for thereafter determining the location of said overheating, said apparatus including a gas stream and a monitor for detecting particles in said gas stream and for emitting a signal when said particles are detected comprising:
   A. preparing a composition which comprises;
      1. at least one compound having the general formula $$HOOC-\underset{R_1}{\overset{R}{\underset{|}{\overset{|}{C}}}}-COOH$$

where R is selected from the group consisting of alkyl to $C_{10}$, aryl, alkyl aryl to $C_{10}$, cycloaliphatic, and heterocyclic, and $R_1$ is selected from the group consisting of R and hydrogen; and
      2. a solution of at least one resinous carrier curable and stable at 60° C and unreactive with said compound;
   B. applying said composition to said electrical apparatus at positions exposed to said gas stream;
   C. evaporating said solvent; and
   D. monitoring said gas stream for the presence of particulates therein.

2. A method according to claim 1 including the additional last step of inspecting said apparatus visually for blistered and darkened areas, after a signal has been emitted, to locate the area of overheating.

3. A method according to claim 1 including the additional steps of collecting a sample of said gas stream after a signal has been emitted and chemically analyzing said sample.

4. A method according to claim 1 wherein said compound contains at least 5 carbon atoms.

5. A method according to claim 4 wherein said compound is monoethylmalonic acid.

6. A method according to claim 4 wherein said compound is dimethylmalonic acid.

7. A method according to claim 1 wherein the amount of said compound is about 20 to about 250 phr and the amount of the solvent in said solution is about 25 to about 75% (by weight based on said resinous carrier).

8. A method according to claim 7 wherein the amount of said compound is about 40 to about 60 phr and the amount of said solvent is about 45 to about 55% (by weight based on said resinous carrier).

9. A method according to claim 1 wherein said resinous carrier is an epoxy resin.

10. A method according to claim 9 which includes about 0.1 to about 3 phr of a drier for said epoxy resin.

11. A method according to claim 10 which is prepared by first mixing said solution of resinous carrier and said drier and then mixing in said compound.

12. A method according to claim 1 wherein the solvent in said solution is toluene.

13. A method according to claim 1 wherein said compound is dispersed in said solution.

14. A method according to claim 1 wherein said resinous carrier is air-dryable.

15. A thermal detection system for electrical apparatus cooled by a gas stream comprising a monitor for detecting the presence of particles in said gas stream, and a coating which comprises a solid layer of a composition of at least one compound having the general formula

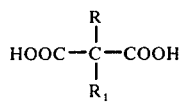

where R is selected from the group consisting of alkyl to $C_{10}$, aryl. alkyl aryl to $C_{10}$, cycloaliphatic, and heterocyclic, and $R_1$ is selected from the group consisting of R and hydrogen, and at least one resinous carrier curable and stable at 60° C and unreactive with said compound, said coating being on a portion of said electrical apparatus exposed to said gas stream.

16. A thermal detection system according to claim 15 wherein said compound contains at least five carbon atoms.

17. A thermal detection system according to claim 16 wherein said compound is monoethylmalonic acid.

18. A thermal detection system according to claim 16 wherein said compound is dimethylmalonic acid.

* * * * *